Patented July 28, 1925.

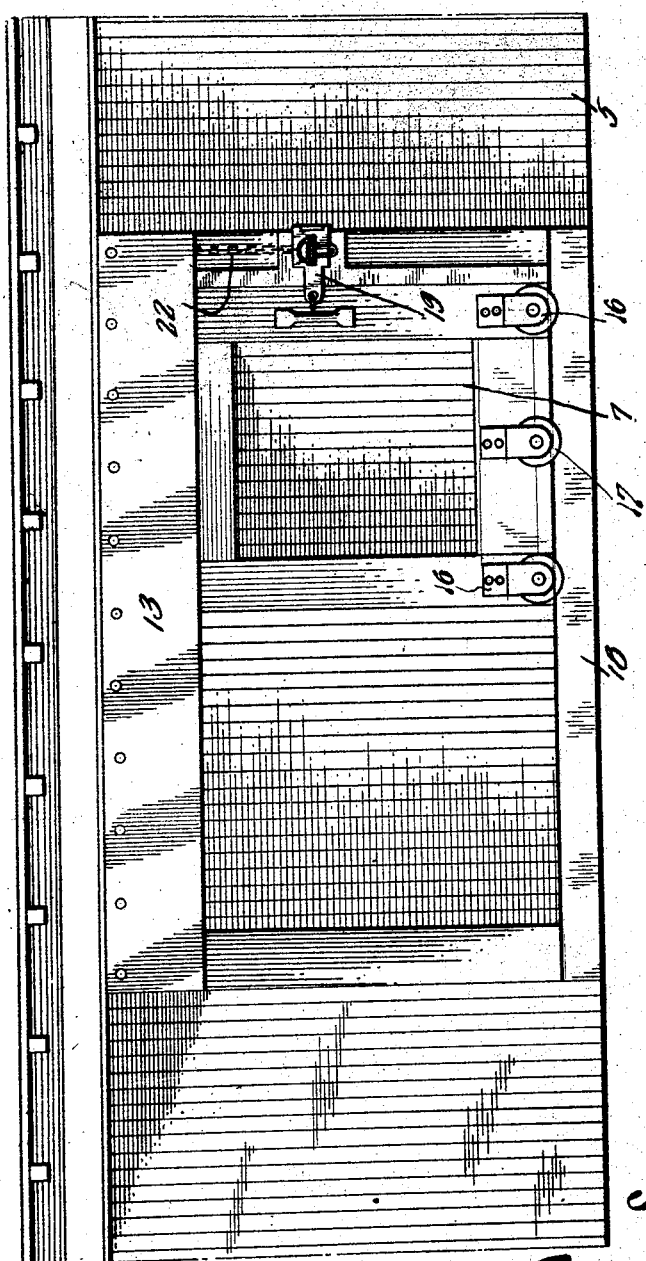

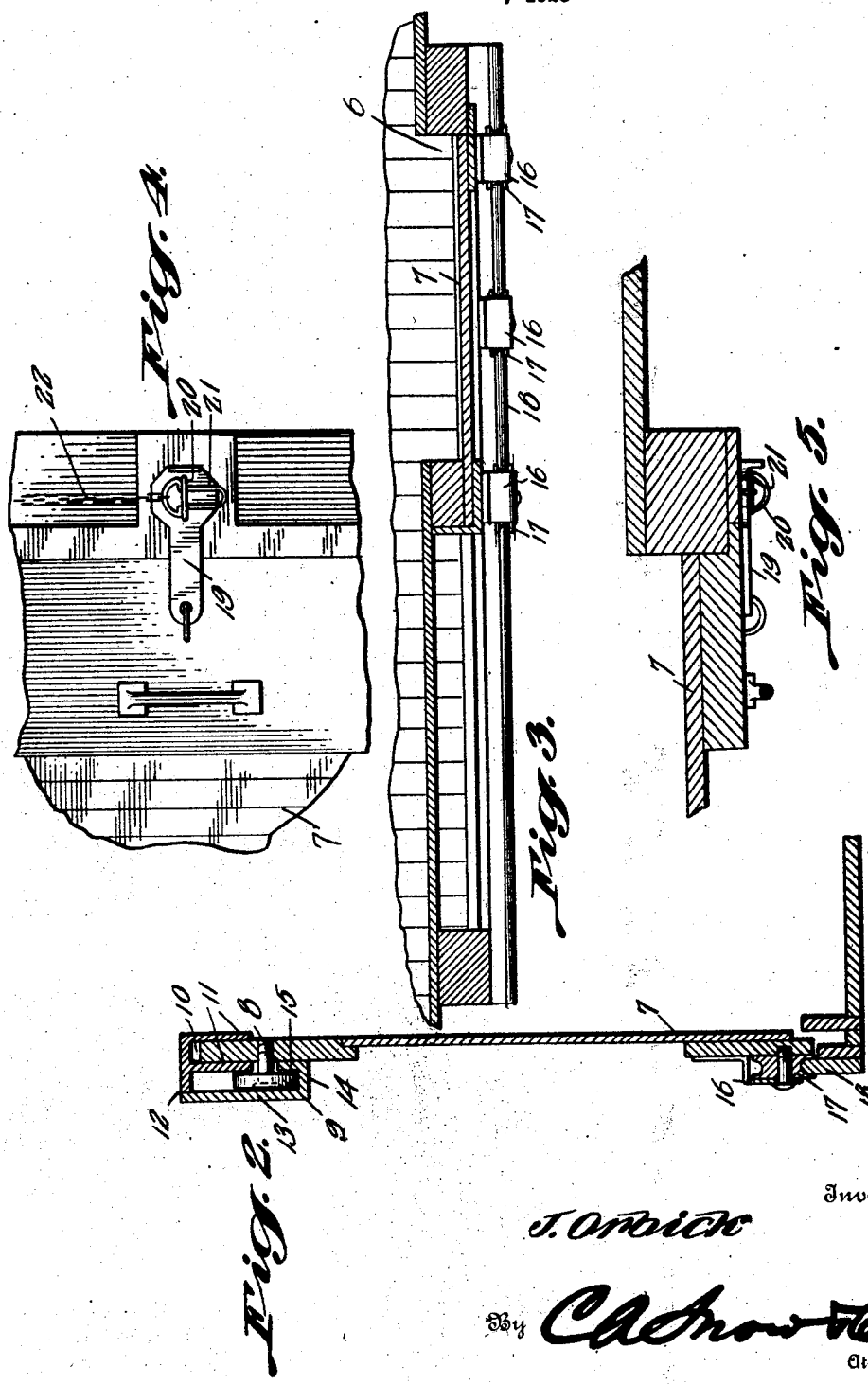

1,547,676

UNITED STATES PATENT OFFICE.

JALAK ORBICK, OF HURLEY, WISCONSIN.

DOOR HANGER.

Application filed February 3, 1923. Serial No. 616,837.

*To all whom it may concern:*

Be it known that I, JALAK ORBICK, a citizen of the United States, residing at Hurley, in the county of Iron and State of Wisconsin, have invented a new and useful Door Hanger, of which the following is a specification.

This invention relates to car door constructions, and aims to provide a novel form of car door to exclude rain, snow or other foreign matter from the interior of the car supplied with the door.

An object of the invention is to provide means for housing the supporting wheels of the door to insure free operation thereof and permit the door to be moved with the minimum amount of force.

Another object of the invention is the provision of a door which will be braced at its upper and lower ends to insure against the door being opened by prying or wedging an instrument thereunder.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a fragmental elevational view of a box car supplied with a door constructed in accordance with the present invention.

Figure 2 is a sectional view through the door and its hangers.

Figure 3 is a transverse sectional view through the door.

Figure 4 is a fragmental elevational view of the latch construction.

Figure 5 is a fragmental sectional view taken directly above the latch construction.

Referring to the drawings in detail, the reference character 5 designates the side of a car which is supplied with an opening 6. The opening 6 is closed by the transversely movable door 7 which may be of any desired construction, the same being provided with a plurality of outwardly extending stub shafts 8 on which are mounted the wheels 9 that support the upper portion of the door proper 7.

The upper end of the door operates in the guideway 10 which includes a pair of spaced flanges 11 that contact with the upper side edges of the door as clearly shown by Figure 2 of the drawings, a laterally extending flange 12 being provided to which the guard plate 13 is secured.

This guard plate 13 extends along the upper edge of the door for a distance to house the wheels 9, when the door 7 is in its open position and as shown, the plate is formed with a horizontal portion 14 providing a track for the wheels 9 and an upwardly extended flange 15 acting as an abutment or guard to restrict lateral movement and further brace the upper extremity of the car door.

At the lower edge of the door 7 are the brackets 16 that support the grooved wheels 17 that operate on the track 18 extending along the lower edge of the car door, whereby the weight of the door is supported at its base to facilitate the movement of the door to its open or closed position.

A hasp indicated at 19 has connection with the door and is formed with an elongated opening to accommodate the keeper 20 which is of a construction to receive the locking member 21 that is secured adjacent to the door by means of the chain 22.

The keeper may also receive the usual seal employed in sealing car doors. From the foregoing it will be seen that due to this construction, the wheels 9 at the upper extremity of the door are housed in a manner to exclude foreign matter such as snow or ice, which usually collects to the end that it is difficult to slide the door to open or close the car.

It might be further stated that the construction of the wheels 17 is such as to restrict lateral movement of the lower extremity of the car door.

Having thus described the invention, what is claimed as new is:—

A hanger for car doors comprising a guard plate having an outwardly and upwardly extended portion providing a track, a guide member comprising an outer flange and an inner flange, the inner flange being disposed directly above the upwardly extended portion of the guard plate, the space between the upper flanges adapted to accommodate the upper end of a door to prevent lateral movement of the door, and wheels carried by the door and adapted to move between the inner flange of the guide member and guard plate, and between the upwardly extended portion of the guard plate and the main portion of the guard plate.

In testimony that I claim the foregoing as my own, I have hereto affixed my signature in the presence of two witnesses.

JALAK ORBICK.

Witnesses:
 ANDREW LAIRD,
 C. H. SEALY.